D. Shattuck.
Street Sweeper.
N° 18,664.  Patented Nov. 17, 1857.
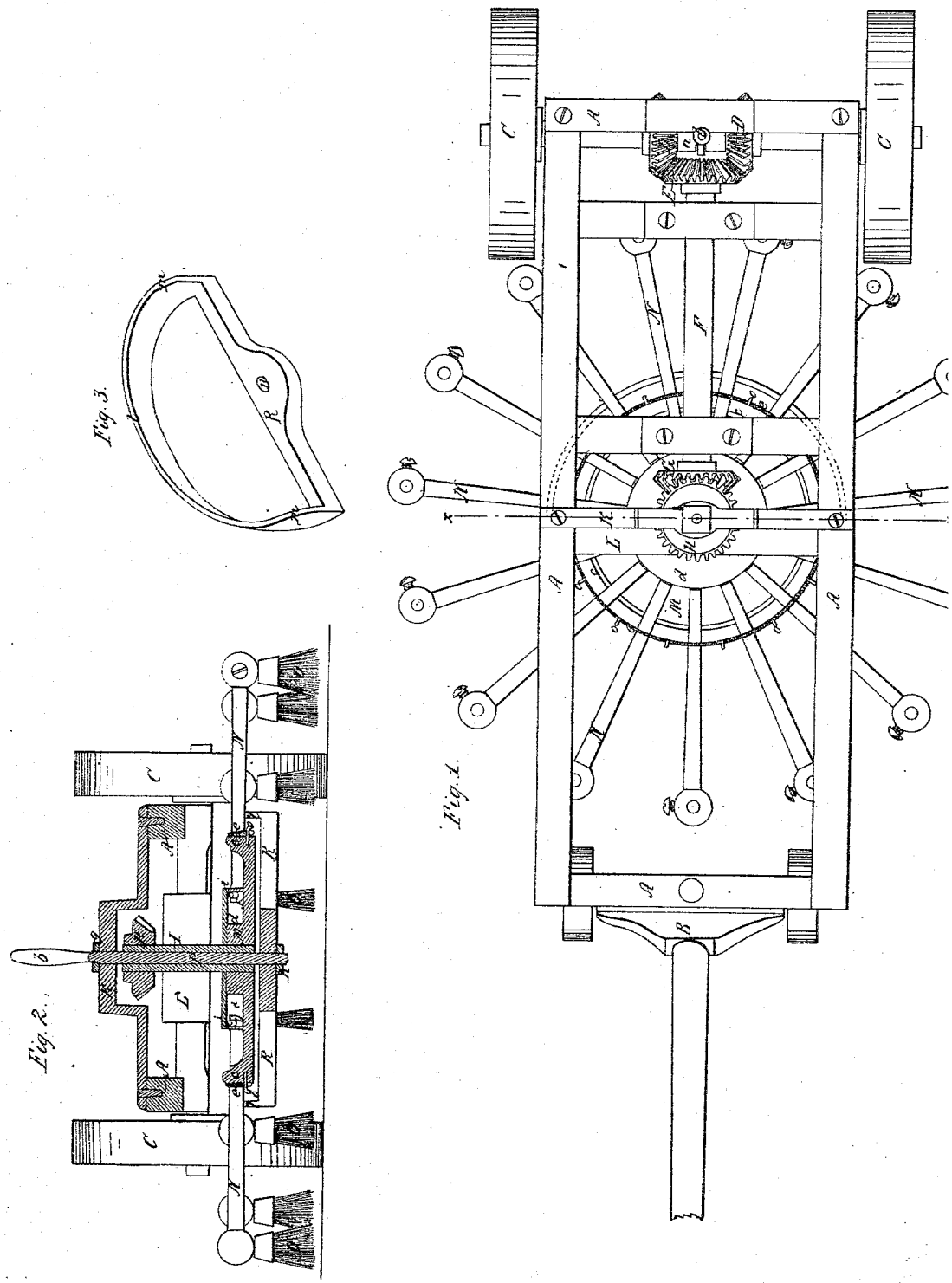

UNITED STATES PATENT OFFICE.

DAVID SHATTUCK, OF BOSTON, MASSACHUSETTS, ASSIGNOR TO HIMSELF, JOHN S. SHATTUCK, JACOB MORRILL, AND WM. P. MARSHALL, OF SAME PLACE.

STREET-SWEEPING MACHINE.

Specification of Letters Patent No. 18,664, dated November 17, 1857.

*To all whom it may concern:*

Be it known that I, DAVID SHATTUCK, of Boston, in the county of Suffolk and State of Massachusetts, have invented a new and Improved Street-Sweeping Machine, of which the following is a full, clear, and exact description, reference being had to the accompanying drawings, making part of this specification, in which—

Figure 1 is a plan of the machine. Fig. 2 is a transverse vertical section on the line $x$ $x$ of Fig. 1. Fig. 3 detail to be referred to.

In the drawings A is the frame of the machine which is carried on a swiveling truck B at its forward end, and on a pair of larger wheels C at the rear end. To the axle of this pair of wheels are attached by splines the beveled cog gears D, which are clutched to and unclutched from the axle by a hand lever $b$, pivoted to the frame that moves a sleeve $a$ on the axle. These gears D engage with another bevel gear E on the end of a horizontal shaft F, which has its bearings in the cross ties of the frame; to the other end of this shaft is attached a level gear G, which engages with a gear H on a hollow vertical shaft I which has bearings in a cross brace L of the frame. To the lower end of this shaft below the brace L is secured a revolving head M, that carries the brush arms N. These arms are attached to the head M in the following manner: The head M is formed with a recess or box $d$, through openings in the side or rim of which are entered the ends of the arms N. The head also has a rim $c$ in rectangular notches in which the arms are placed; a series of pins or hooks $o$ is placed around the periphery of the head M intermediate between the arms, under which hooks and over the arms is placed an elastic cord $e$, which serves to draw down the arms into their notches; the end of each arm is hooked as shown in Fig. 2 at $f$. It is retained in the box $d$ by a wire or ring $i$ which is laid in the hook before the cap or lid of the box $d$ is screwed down. This arrangement allows to each arm a slight vertical vibration on its inner end. To the outer end of each arm is attached a brush O. Through the hollow shaft I passes a rod P. It is supported by a nut and screw $g$ which rests on a cross piece K, extending from one side of the frame to the other; to the lower end of this rod is secured by a nut and screw $h$ a semicircular cam R, (seen detached in Fig. 3) the edge $l$ of which rises just outside of the rim of the head M. This edge is cut away at each corner as at $m$, to allow the arms N to rise up onto it. This cam R may be adjusted in any required position beneath the head M by loosening one of the nuts on the rod P, which passes through a hole $n$ in the straight cross piece or axis of the cam and turning the cam around and again securing it. The position of this cam regulates the place in which the dirt shall be deposited as it is swept up into winrows. The beveled cog wheels D are so arranged with the sleeve $a$ that as the hand lever $b$ is thrown over toward one side of the machine, one of these wheels shall engage with the wheel E, while the other wheel D runs loosely on the axle, and thus cause the shaft I to be revolved in one direction, or the lever is reversed and this shaft is driven in the opposite direction; or it may be placed in an intermediate position when neither wheel D will be engaged with the sleeve $a$, and the machine may progress without revolving the brushes.

The operation of this machine is as follows: When the cam R is in the position shown in the drawings, or with its diameter at right angles to the longer axis of the machine, the dirt is swept up in a row on either side of the machine according to the direction in which the brush head M may be revolving. As the machine is drawn along over the ground the head M is revolved in a horizontal plane and the brushes O sweep the dirt before them until each arm N, as it travels around, rises onto the edge $l$ of the cam R and its brush is lifted out of contact with the ground until the head M has made a half revolution when the arm again drops off the cam and its brush commences to sweep. The brushes thus sweep while they are revolving through a semicircle and deposit the dirt in a winrow as they begin to rise on the cam R. Thus by altering the position of this cam the winrow may be left either at the one side or under the machine as may be desired.

What I claim as my invention and desire to secure by letters patent is—

The above described arrangement of the cam R beneath the horizontal arms, or brush carriers N whereby the dirt may be thrown to either side or to the center of the street as set forth.

DAVID SHATTUCK.

Witnesses:
THOS. R. ROACH,
E. MASSON.